US009767048B2

(12) United States Patent
Hagspiel et al.

(10) Patent No.: US 9,767,048 B2
(45) Date of Patent: Sep. 19, 2017

(54) INITIALIZING I/O DEVICES (71) Applicant: INTERNATIONAL BUSINESS MACHINES CORPORATION, Armonk, NY (US)

(72) Inventors: Norbert Hagspiel, Wendlingen (DE); Sascha Junghans, Ammerbuch (DE); Matthias Klein, Boeblingen (DE); Joerg Walter, Tuebingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 62 days.

(21) Appl. No.: 14/862,221

(22) Filed: Sep. 23, 2015

(65) Prior Publication Data
US 2016/0098363 A1 Apr. 7, 2016

(30) Foreign Application Priority Data
Oct. 7, 2014 (GB) .................................. 1417684.6

(51) Int. Cl.
*G06F 13/10* (2006.01)
*G06F 13/20* (2006.01)
*G06F 13/40* (2006.01)

(52) U.S. Cl.
CPC ............ *G06F 13/102* (2013.01); *G06F 13/20* (2013.01); *G06F 13/4068* (2013.01)

(58) Field of Classification Search
CPC ........ G06F 13/102; G06F 13/105; G06F 9/52; G06F 13/20; G06F 13/36
See application file for complete search history.

(56) References Cited

U.S. PATENT DOCUMENTS

| 6,061,749 | A | * | 5/2000 | Webb ..................... G06F 9/3879 345/603 |
|---|---|---|---|---|
| 6,081,852 | A | | 6/2000 | Baker |
| 7,277,968 | B2 | | 10/2007 | Brice, Jr. et al. |
| 7,783,842 | B2 | | 8/2010 | Arimilli et al. |
| 8,046,576 | B2 | | 10/2011 | Zimmer et al. |
| 8,201,167 | B2 | | 6/2012 | Anderson et al. |
| 8,468,276 | B2 | | 6/2013 | Brownlow et al. |
| 2005/0268083 | A1 | | 12/2005 | Poisner et al. |

(Continued)

OTHER PUBLICATIONS

Walter et al., GB Search Report for GB Application No. GB 1417684.6, dated Apr. 1, 2015 (3 pages).

*Primary Examiner* — Ernest Unelus
*Assistant Examiner* — Ronald Modo
(74) *Attorney, Agent, or Firm* — Steven Chiu, Esq.; Kevin P. Radigan, Esq.; Heslin, Rothenberg, Farley & Mesiti (57) ABSTRACT

A data processing system is provided which includes a processor nest communicatively coupled to an input/output bus by a bus controller, and a service interface controller communicatively coupled to the processor nest. The system includes storage for storing commands for the bus controller and associated command data and resulting status data, the storage being communicatively coupled to the processor nest and the bus controller. The service interface controller is configured, in response to received service commands, to read and write the storage, to execute the command specified in the storage, to retrieve the result of the command, and to store the result in the storage.

17 Claims, 6 Drawing Sheets

(56) References Cited

U.S. PATENT DOCUMENTS

2006/0136789 A1\* 6/2006 Oshida ............... G06F 11/0745
714/43
2015/0370655 A1\* 12/2015 Tucek ................. G06F 3/0619
714/15

\* cited by examiner

INITIALIZING I/O DEVICES

PRIOR FOREIGN APPLICATION

This application claims priority from United Kingdom (GB) patent application number 1417684.6, filed Oct. 7, 2014, which is hereby incorporated herein by reference in its entirety.

BACKGROUND

The present invention relates in general to data processing systems, and in particular, to initialize I/O devices of a data processing system as well as a method for initializing I/O devices of a data processing system. In a virtualized system, a single peripheral component interconnect express (PCIe) hardware device may appear as multiple PCIe virtual devices that are each capable of providing virtual functions. Multiple logical partitions in the virtualized system may have access to one or more of the multiple PCIe virtual devices.

When an input/output (I/O) adapter is plugged into a PCIe slot on a computer motherboard, the maximum number of virtual functions that are available for use may vary based on various factors, such as the design of the card, the manufacturer of the card, and the PCIe slot into which the I/O adapter is plugged. For example, the capabilities of the PCIe slot into which the I/O adapter is plugged may affect the maximum number of available virtual functions. In addition, the maximum number of virtual functions associated with each port of the I/O adapter may be set when the virtualized system is initialized. The virtualized system may be reinitialized to reconfigure the maximum number of virtual functions associated with each port of the I/O adapter.

U.S. Pat. No. 8,468,276 B2 discloses a computer-implemented method, which includes initializing a driver associated with an input/output adapter in response to receiving an initialize driver request from a client application. The computer-implemented method includes initializing the input/output adapter to enable adapter capabilities of the input/output adapter to be determined. The computer-implemented method also includes determining the adapter capabilities of the input/output adapter. The computer-implemented method further includes determining slot capabilities of a slot associated with the input/output adapter. The computer-implemented method also includes setting configurable capabilities of the input/output adapter based on the adapter capabilities and the slot capabilities.

U.S. Pat. No. 8,468,276 B2 also discloses a computer program product, which includes a non-transitory computer usable medium having computer usable program code embodied therewith. The computer usable program code is executable by a processor to set configurable capabilities of the input/output adapter based on the adapter capabilities and the slot capabilities. The configurable capabilities include a maximum number of virtual functions associated with the input/output adapter and a maximum number of virtual functions associated with each port of the input/output adapter.

U.S. Pat. No. 8,468,276 B2 further discloses a system, which includes an adapter abstraction layer comprising computer usable program code that is stored at a non-transitory computer usable medium. The adapter abstraction layer is executable by the processor to initialize a driver associated with an input/output adapter in response to receiving an initialize driver request from a client application. The adapter abstraction layer is executable by the processor to initialize the input/output adapter to enable adapter capabilities of the input/output adapter to be determined. The adapter abstraction layer is further executable by the processor to determine the adapter capabilities of the input/output adapter. The adapter abstraction layer is also executable by the processor to determine slot capabilities of a slot associated with the input/output adapter. The adapter abstraction layer is executable by the processor to set configurable capabilities of the input/output adapter based on the adapter capabilities and the slot capabilities. The configurable capabilities include a maximum number of virtual functions associated with the input/output adapter, a maximum number of virtual functions associated with each port of the input/output adapter, a maximum number of queues assigned to each virtual function, a maximum number of interrupts assigned to each virtual function, another parameter associated with the virtual functions, or any combination thereof.

SUMMARY

Provided herein, in one or more aspects, is a data processing system comprising a processor nest communicatively coupled to an input/output bus by a bus controller, and a service interface controller communicatively coupled to the processor nest. The system further includes: storage for storing commands for the bus controller and associated command data and resulting status data, the storage being communicatively coupled to the processor nest and the bus controller, and the service interface controller being configured, in response to received service commands, to read and write the storage, to execute the command specified in the storage, to retrieve the results of the command, and to store the result to the storage.

In one or more other aspects, a method is provided for communicating to an input/output bus of a data processing system. The data processing system includes a processor nest communicatively coupled to the input/output bus by a bus controller, and a service interface controller communicatively coupled to the processor nest. The method includes: storing commands for the bus controller and associated command data and resulting status data in a storage, the storage being communicatively coupled to the processor nest and the bus controller; reading and writing the storage by the service interface controller, in response to a received service command, executing the command specified in the storage, retrieving the result of the command, and storing the result of the command in the storage.

In one or more further aspects, a computer program product is provided for facilitating communicating to an input/output bus of a data processing system. The computer program product includes a computer readable storage medium storing a computer readable program, wherein the computer readable program, when executed by a processor, causes the processor to perform a method for communicating to the input/output bus of the data processing system, the data processing system comprising a processor nest communicatively coupled to the input/output bus by the bus controller, and a service interface controller communicatively coupled to the processor nest. The method includes: storing commands for the bus controller and associated command data and resulting status data in storage, the storage being communicatively coupled to the processor nest and the bus controller; reading and writing the storage by the service interface controller, in response to a received service command; executing the command specified in the storage; retrieving the result of the command; and storing the result of the command in the storage.

BRIEF DESCRIPTION OF THE DRAWINGS

The present invention together with certain objects and advantages noted herein may best be understood from the following detailed description of the depicted embodiments, but not restricted to the illustrated embodiments, wherein is shown in.

DETAILED DESCRIPTION

In the drawings, like elements are referred to with similar reference numerals. The drawings are merely schematic representations, not intended to portray specific parameters of the invention. Moreover, the drawings are intended to depict only exemplary embodiments of the invention and therefore should not be considered as limiting the scope of the invention.

Figure 1:
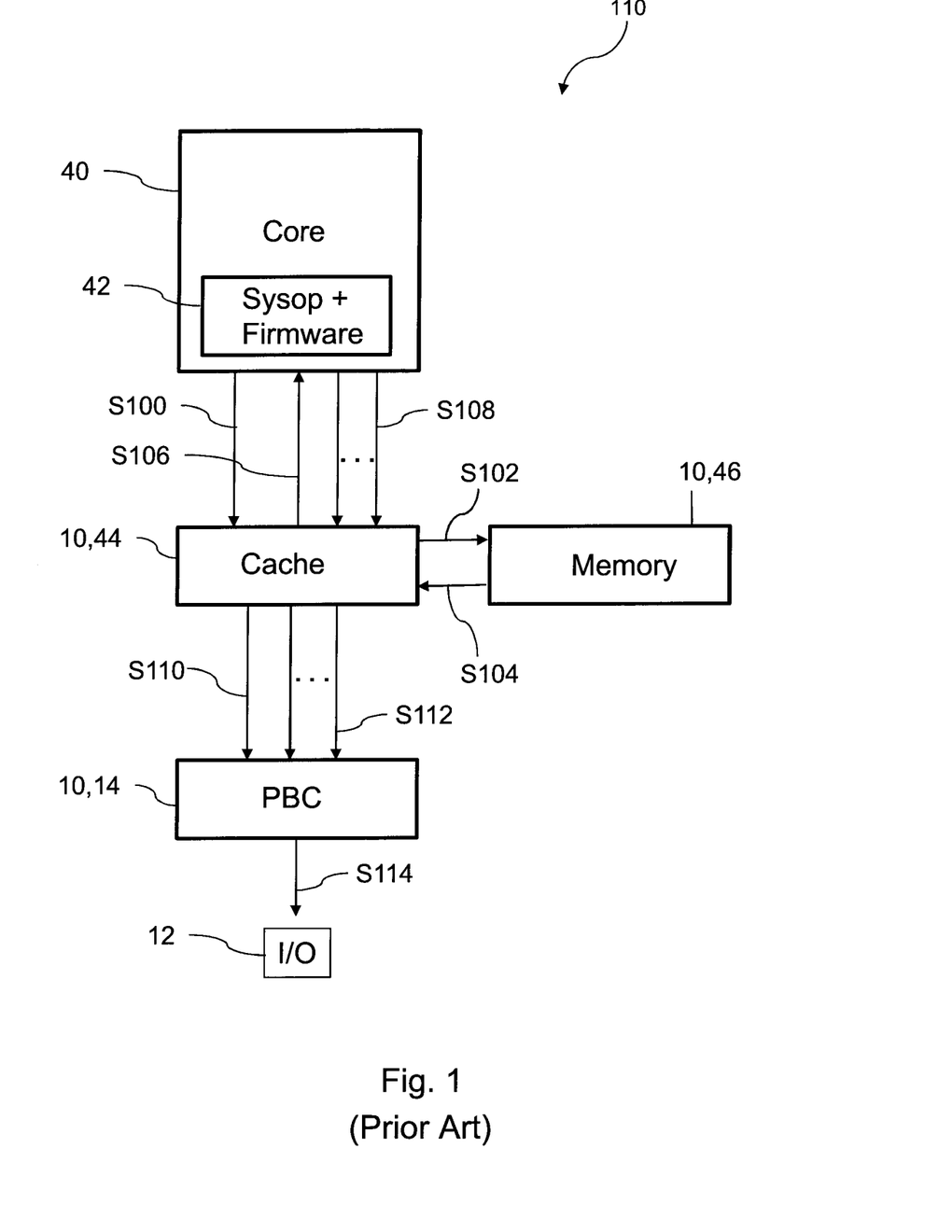
FIG. 1 a data processing system comprising a processor core, a cache, a memory and a bus controller connected to an I/O bus according to prior art.

FIG. 1 depicts a data processing system 110 comprising a processor core 40, a cache 44, a memory 46 and a bus controller 14 connected to an I/O bus 12 according to a conventional system. A processor nest 10 in this configuration comprises the cache 44, the memory 46 as well as the bus controller 14. An operating system 42 is running in firmware on the processor core 40. The processor core 40 is connected to cache 44, which may be implemented as a typical L3 cache, communicating on one side with a memory 46 and on the other side with I/O bus 12. L3 is the level of the cache hierarchy in the data processing system 210. The lower the level number, the higher is the speed of the cache. By way of example, the bus controller 14 may be a PCIe bridge controller (PBC).

An initial startup of processor core 40 and the processor nest 10 would require to load an I/O code and to start the bringup of the I/O and attached devices. An example would be the execution of an external command xcmd CI Store, as explained hereafter. In step S100, the operating system 42 sends a fetch request to the L3 cache 44 (xcmd store data). In step S102, the L3 cache 44 sends a fetch request to the memory 46, followed by step S104, which results in the memory 46 sending back the xcmd store data. In step S106 the L3 cache 44 returns xcmd store data to the processor core 40 and in step S108 the processor core 40 sends xcmd and xcmd store data to the L3 cache 44. Then in step S110 the L3 cache 44 sends xcmd CI Store to the bus controller 14. In step S112 the L3 cache 44 sends the xcmd hub address and store data to the bus controller 14, followed by step S114, where the bus controller 14 sends the xcmd and xcmd data to the I/O bus 12.

Figure 2:
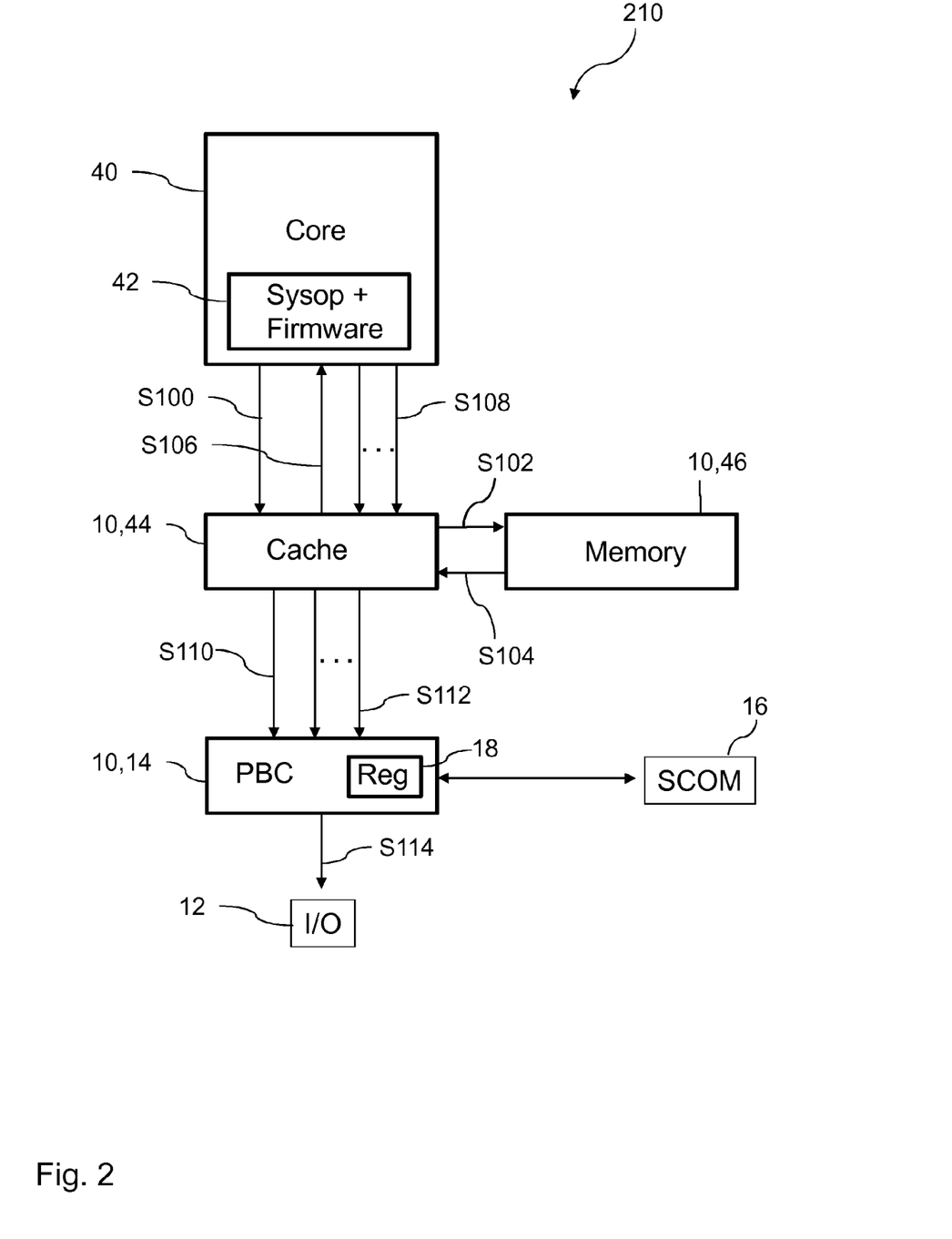
FIG. 2 a data processing system comprising storage means in a bus controller communicating to a service interface controller, in accordance with one or more aspects of the present invention.

FIG. 2 shows a data processing system 210 comprising storage means 18 in a bus controller 14 communicating to a service interface controller 16, according to one or more aspects of the present invention, a processor nest 10 comprising an L3 cache 44, a memory 46 and the bus controller 14. The storage means 18 are implemented in the bus controller 14. The bus controller 14 is connected to the service interface controller 16.

The data processing system 210, comprising the processor nest 10 communicatively coupled to the input/output bus 12 by the bus controller 14, and the service interface controller 16 communicatively coupled to the processor nest 10, includes the storage means 18 for storing commands for the bus controller 14 and associated command data and resulting status data, the storage means 18 communicatively coupled to the processor nest 10 and the bus controller 14. The service interface controller 16 is being configured, in response to received service commands, to read and write the storage means 18, to execute the command specified in the storage means 18, to retrieve the result of the command, and to store the result in the storage means 18. The service interface controller 16 in FIG. 2 is connected directly to the bus controller 14. The service interface controller 16 is communicatively coupled to state machines of the processor nest 10 performing operations thereof.

The data processing system 210, shown in FIG. 2, is adapted to implement a method for communicating to an input/output bus 12 of a data processing system 210, the data processing system 210 comprising a processor nest 10 communicatively coupled to the input/output bus 12 by the bus controller 14, and further comprising a service interface controller 16 communicatively coupled to the processor nest 10. The method includes: (i) storing commands for the bus controller 14 and associated command data and resulting status data in storage means 18, the storage means 18 communicatively coupled to the processor nest 10 and the bus controller 14, (ii) reading and writing the storage means 18 by the service interface controller 16, in response to a received service command, (iii) executing the command specified in the storage means 18, (iv) retrieving the result of the command, and (v) storing the result of the command in the storage means 18.

According to one or more aspects of the present invention, a dedicated hardware resource comprising storage means 18 is connected to the service interface controller 16 or service communication interface (SCOM) on one side and to the state machines performing processor-to-I/O operations via external commands (xcmd) on the other side. This path allows I/O access without the need for a functional processor core/nest. In one or more aspects, the present invention advantageously reduces bringup time, and can also be used in a functional data processing system 210 to, for example, read/write all registers accessible by the service interface controller 16 during regular operation without the necessity of a code change/reload. When used in functional mode, commands from the service interface controller are interleaved with commands from the mainline path. Service interface commands are tagged, so their result from IO is not forwarded to the processor nest, but to a status register instead.

Advantageously communication between the service interface controller 16 and the bus controller 14 may be performed without a processor core 40 running. The service interface controller 16 is thus able to initiate relevant commands for communicating with an I/O subsystem of the data processing system 210 for sending data to and receiving information from the I/O subsystem. Thus it is possible to bringup the I/O subsystem in complete separate manner and speedup the whole bringup process significantly.

In addition, it is possible to reach the mainline I/O path, i.e. the I/O bus 12 via the service interface controller 16. Instead of receiving commands from the processor nest 10, three additional registers in the logic, the storage means 18, may be used to control I/O operations: a command register, a data register and a status register. They are written and read from the service interface controller 16. For example, for a store command to I/O bus 12, store data would be written to the data register. A store command with the store address would be written to the command register. Then the state machines used to handle processor commands would send the command with data to the I/O bus 12. A response from the I/O bus 12 may be stored in the status register. It also indicates completion of the command. In this way, it is possible to write I/O test programs for performing functional commands which would normally be executed by the processor core 40, but could according to one or more aspects of the present invention, be executed even when no processor core 40 works, allowing bringup of I/O devices 12 to start in parallel with processor nest 10 bringup. This feature may be used to reduce bringup time, yet it could also be used with data processing system 210 in a functional state.

Figure 3:
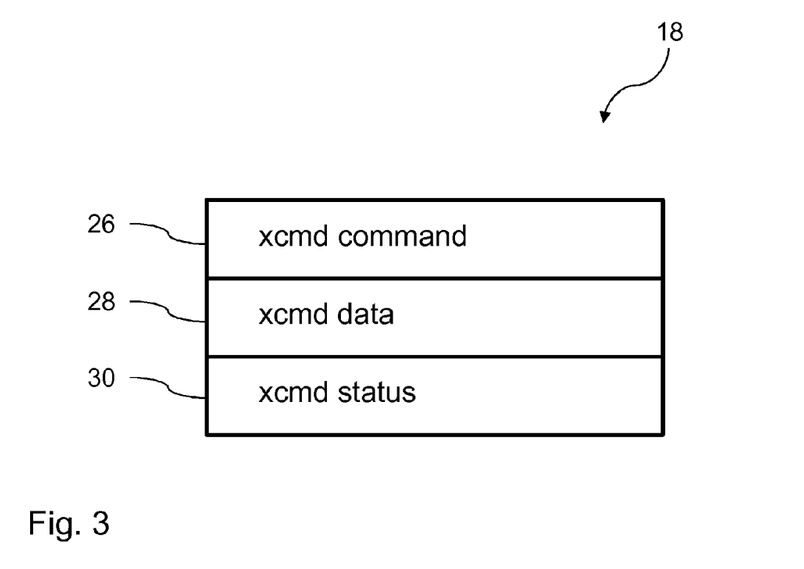
FIG. 3 one embodiment of storage means implemented in unit registers, in accordance with one or more aspects of the present invention.

FIG. 3 depicts one embodiment of storage means 18 implemented in unit registers according to one or more aspects of the present invention. The storage means 18 comprise at least a command register 26, a data register 28 and/or a status register 30. The command register 26 may contain commands to be generated for the I/O bus 12, which may comprise either a component interconnect (CI) Load (8 Byte Fetch) or CI Store (8 Byte Store), as well as a hub address. The hub address may contain the I/O address and routing bits to select an I/O bus port. The data register 28 may contain for a CI Load, the data fetched from I/O bus 12 after the command has finished. For a CI Store, the data register 28 may contain data to be written to I/O devices 12. The status register 30 may contain completion bits to indicate whether an I/O access is finished, as well as status bits returned from I/O bus 12 to indicate success or failure of the command.

Figure 4:
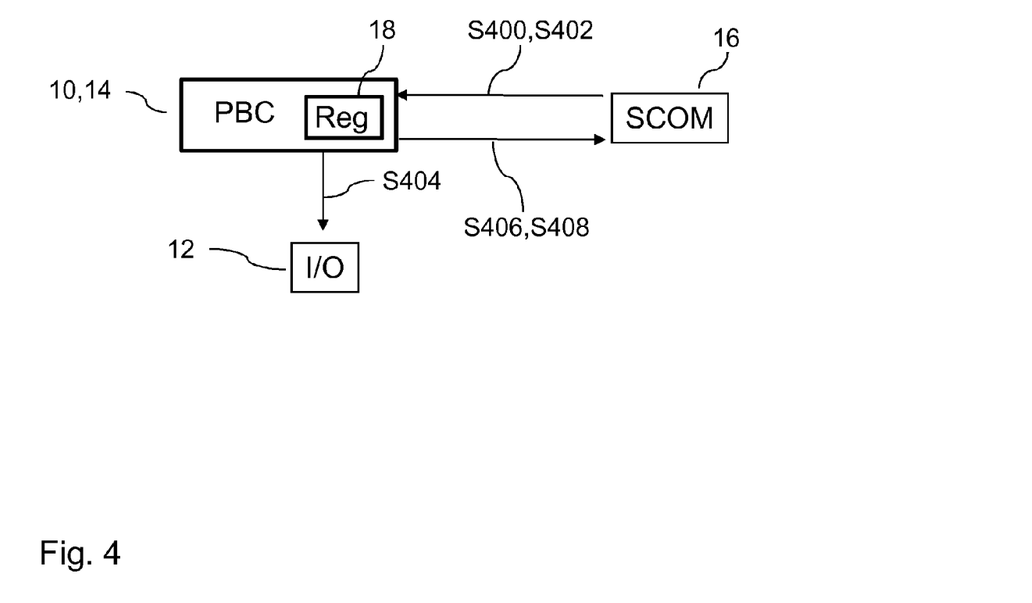
FIG. 4 exemplary communication between a service interface controller, a bus controller and an I/O bus according to one embodiment for an xcmd CI Store example, in accordance with one or more aspects of the present invention.

FIG. 4 depicts communication between a service interface controller 16, a bus controller 14 and an I/O bus 12 according to one embodiment of the present invention, and in particular, for an xcmd CI Store example. The communication between the service interface controller 16 and the bus controller 14 is being performed without a processor core 40 running.

FIG. 4 illustrates communication details through an example of an xcmd CI Store command. In step S400, a write to an xcmd data register is performed, followed by a write to an xcmd command register in step S402. Then in step S404, the bus controller 12 sends an xcmd and xcmd data to the I/O bus 12. A poll to the xcmd status register is performed in step S406, until xcmd is finished. In step S408, the xcmd status register is read.

Figure 5:
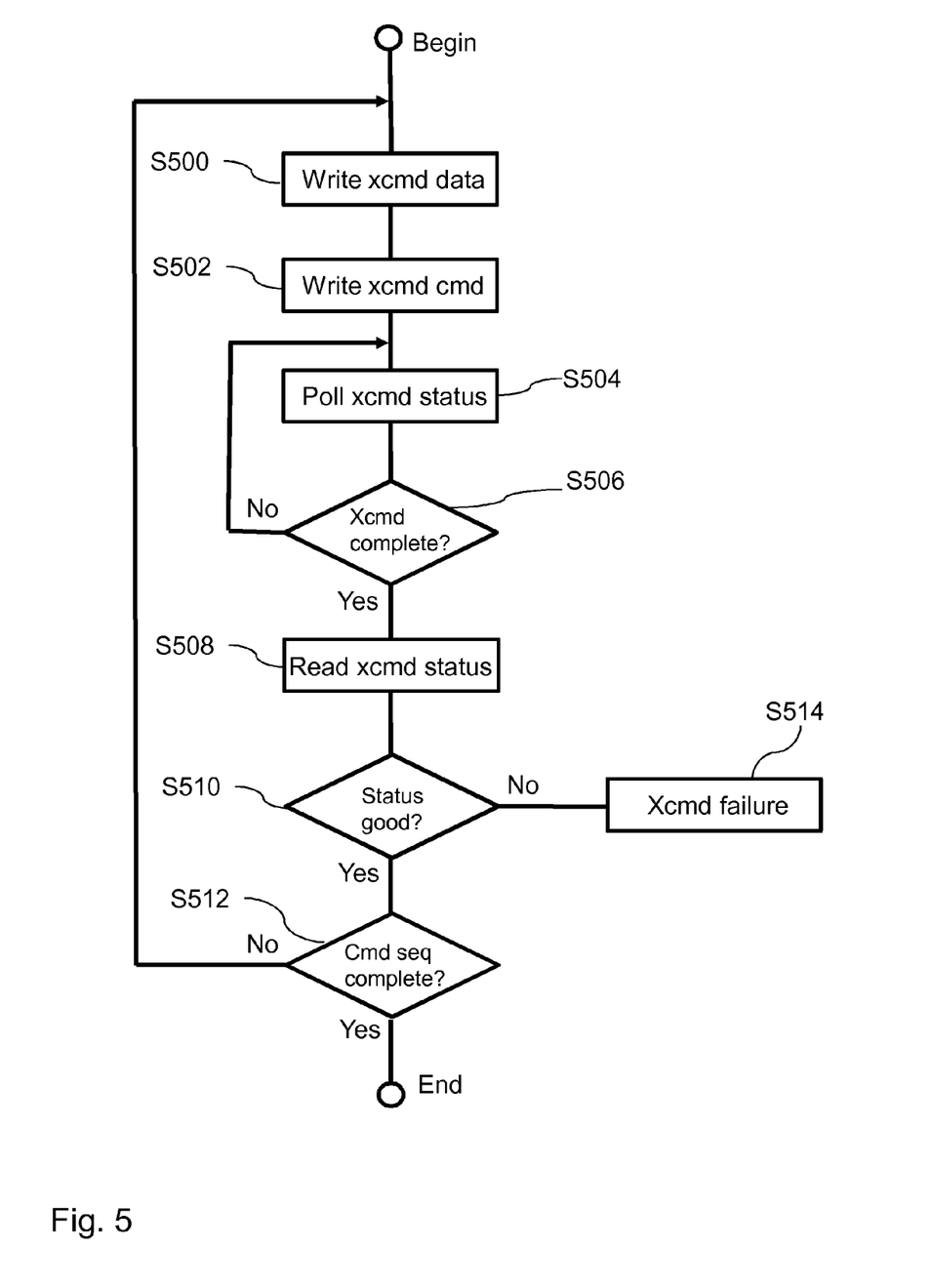
FIG. 5 a flow chart for the execution of a test program in a data processing system according to the xcmd CI Store example of FIG. 4, in accordance with one or more aspects of the present invention.

In FIG. 5 a flow chart is shown for the execution of a test program in a data processing system 210 according to the xcmd CI Store example of FIG. 4. The test program is performing the same functional steps which would otherwise be performed by the processor core.

A test program implementing the xcmd CI Store example of FIG. 4 might include:

```
// SCOM to IO Bus test
// Write xcmd data register:
WRITE, 0x02010006, 0x0123456789ABCDEF
// Write xcmd command register:
WRITE, 0x02010005, 0xC008101234567890
// Poll xcmd status register (completion)
POLL, 0x02010007, 0x0100000000000000, 0x0F00000000000000, 250
// Read xcmd status register (status)
READ, 0x02010007, 0x0000000000000000, 0x00FF000000000000
// (Poll and read xcmd status could be done in one command)
```

The write command syntax hereby is WRITE, address, data.

The poll command syntax is POLL, address, data, mask, max_iterations (read data from address, only data bits with corresponding mask bits are valid. Returns a fail if there is no match after at most max_iterations). The read command syntax is READ, address, data, mask (read data from address, only data bits with corresponding mask bits are valid).

The flow chart in FIG. 5 starts in step S500 by writing the data register, followed in step S502 by writing the command. Then in step S504, the status is polled. After that it is checked in step S506 if the xcmd is complete. If not, then the polling operation is repeated. If yes, then the status is read in step S508. If the status is good in step S510, next a check is done, if the command sequence is complete, S512. If yes, then the program is ended. If not, the whole cycle is repeated from the beginning, S500. If in step S510 the status is not good, then an xcmd failure is reported in step S514.

Figure 6:
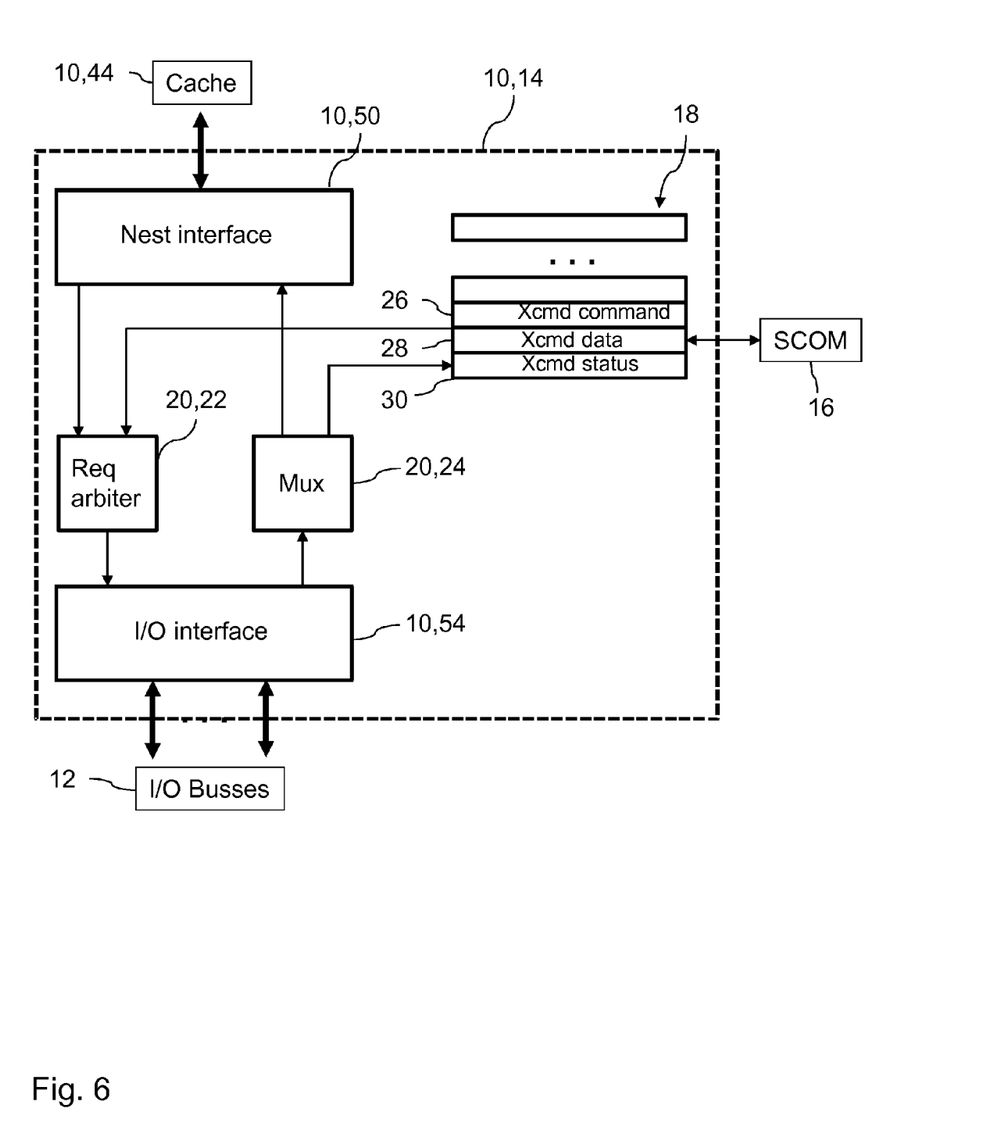
FIG. 6 a block diagram of a bus controller comprising storage means communicating to a service interface controller, in accordance with one or more aspects of the present invention.

FIG. 6 depicts a block diagram of a bus controller 14 comprising storage means 18 communicating to a service interface controller 16 according to one or more embodiments of the present invention. As shown, a nest interface 50 in the bus controller 14 is communicating to the L3 cache 44 of the processor nest 10. The nest interface 50 is connected on the other side to interface means or interface arbiter 20, comprising a request arbiter 22 and a multiplexer 24. The interface means 20 are connected to an I/O interface 54 directly communicating to I/O buses 12. Storage means 18, comprising, among other registers, a command register 26, a data register 28 and a status register 30, is communicating to the interface means 20, as well as to the service interface controller 16.

The interface means 20 are provided to interleave communication from the bus controller 14 to the processor nest 10 and the service interface controller 16. The interface means 20 comprise at least the request arbiter 22 and/or the multiplexer 24. Commands from the service interface controller 16 are interleaved with commands from the processor nest 10 by using interface means 20. In order to perform the interleave function, commands from the service interface controller 16 are tagged, i.e. they are marked with flags.

Information flow in the bus controller 14 in the functional mode is going from the processor core 40 through the L3 cache 44 and the nest interface 50 to the request arbiter 22. From there, information is fed through the I/O interface 54 to the I/O buses 12. In the mode where the service interface controller 16 is used, information is fed through the storage means 18 to the request arbiter 22 and from there to the I/O interface 54 and the I/O buses 12. Information flowing back from the I/O buses 12 is fed through the multiplexer 24 to either the nest interface 50 or the storage means 18 depending from where the request for the information was sent. The multiplexer 24 is thus controlled by the tag returned from IO, indicating the xcmd origin. In this way, it is possible to distinguish between information flow from the processor core 40 to the I/O devices 12 and from the service interface controller 16 to the I/O devices 12.

Figure 7:
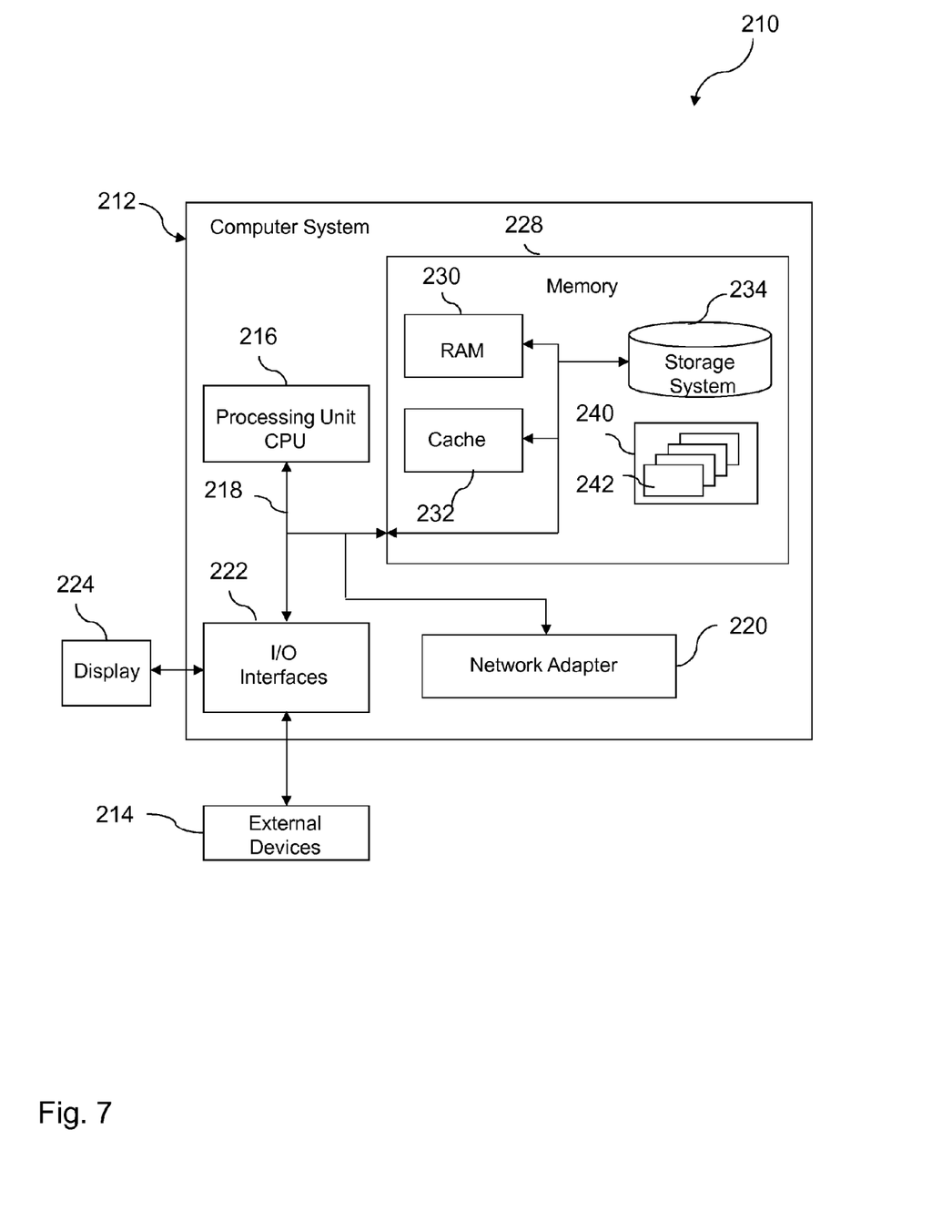
FIG. 7 an example embodiment of a data processing system for carrying out a method for communicating to an I/O bus via a service interface controller, in accordance with one or more aspects of the present invention.

Referring now to FIG. 7, a schematic of an example of a data processing system 210 is shown. Data processing system 210 is only one example of a suitable data processing system and is not intended to suggest any limitation as to the scope of use or functionality of the invention described herein. Regardless, data processing system 210 is capable of being implemented and/or performing any of the functionality set forth herein.

As illustrated in FIG. 7, the data processing system 210 is capable of running a computer program product comprising a computer usable medium including a computer readable program, wherein the computer readable program when executed on a computer system 212 causes the computer system 212 to perform a method such as described above for communicating to an input/output bus of the data processing system.

Referring to FIG. 7, in data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, microcontrollers, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216. Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data.

Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

Note that the present invention provides a data processing system for initializing I/O devices of a data processing system in order to bring up the data processing system in a time and cost efficient way.

In addition, a method is provided for initializing I/O devices of a data processing system in order to bring up a data processing system in a time and cost efficient way; and a computer program product is provided for initializing I/O devices of a data processing system in order to bring up a data processing system in a time and cost efficient way.

According to one aspect of the present invention, a data processing system is proposed, comprising a processor nest communicatively coupled to an input/output bus by a bus controller. The data processing system further comprises a service interface controller communicatively coupled to the processor nest, comprising storage means for storing commands for the bus controller and associated command data and resulting status data, the storage means communicatively coupled to the processor nest and the bus controller. The service interface controller is being configured, in response to received service commands, to read and write the storage means, to execute the command specified in the storage means, to retrieve the result of the command, and to store the result in the storage means.

Conventionally, the bringup of I/O devices for a new data processing system is possible only after the processor core works, at least to a point where it can send commands to the I/O devices in order to initialize the I/O devices.

For the bringup of the I/O devices of a data processing system it is necessary to initialize the I/O devices by sending control commands from a processor to the attached I/O devices. Therefore the processor must be functional to a point where it can send commands to the I/O devices, before the bringup of the I/O devices can start. So, in the beginning of the bringup process, the processor bringup and the bringup of the I/O devices are serialized, causing delays in the bringup process, because problems in I/O can be found only after the processor is at least partially functional.

Bringup of the I/O devices is therefore idling until bringup of a processor nest is at least partially done. This causes long bringup times, because bringup of processor nest and I/O are serialized in the beginning of the bringup phase.

The invention presented describes a data processing system to reach the mainline I/O path via a service interface controller. The service interface controller hereby is a serial interface which is available in most data processing systems for the purpose of diagnosis and initialization of the data processing system. Instead of receiving commands from a processor nest, three additional registers in the logic are used by the service interface controller to control I/O operations: a command register, a data register and a status register. They are written and read from the service interface controller. E.g. for a store command to I/O devices, store data would be written to the data register. A store command with the store address would be written to the command register. Then the state machines used to handle processor commands would send the command with data to the I/O devices. Response from the I/O devices is stored in the status register. It also indicates completion of the command. In this way it is possible to write I/O test programs for performing functional commands which would normally be executed by the processor, but could according to the invention be executed even when no processor core works, allowing bringup of I/O devices to start in parallel with processor bringup. This feature is used to reduce bringup time, yet it could also be used during the data processing system being in a functional status. The reduction of the bringup time may exhibit typically values of e.g. 2 weeks reduction for a normal bringup time of six weeks.

According to the invention a dedicated hardware resource comprising storage means is connected to a service interface controller or service communication interface (SCOM) on one side and to state machines performing processor-to-I/O operations via external commands (xcmd) on the other side. This path allows to exercise I/O access without the need for a functional processor core/nest. The purpose of the invention is to reduce bringup time, but it can also be used in a functional data processing system to e.g. read/write all registers accessible by the service interface controller during regular operation without the necessity of a code change/reload. When used in functional mode, commands from the service interface controller are interleaved with commands from the mainline path. Service interface commands are tagged, so their result from I/O devices is not forwarded to the processor nest, but to a status register instead.

Due to an advantageous embodiment, the service interface controller may be connected directly to the bus controller. This enables the data processing system to send commands directly to the I/O devices even when without control of the processor core, even when the processor core is not yet running By this way it is possible to bringup the I/O devices or subsystem without control of the processor core.

According to an advantageous embodiment, the service interface controller may be communicatively coupled to state machines performing operations between the processor nest and the bus controller. This feature enables to communicate with the I/O subsystem without control of the processor core in order to facilitate and speedup the bringup of the I/O subsystem in parallel to the bringup of the processor nest.

Due to an advantageous embodiment, and interface arbiter or interface means may be provided to interleave communication from the bus controller to the processor nest and the service interface controller. Thus, it is possible to control the communication between the processor nest to the I/O devices and separate them from the communication of the service interface controller to the I/O devices and keep them separate in order not to mix up the information flows between the different devices and systems.

Advantageously, the interface means therefore may comprise at least a request arbiter and/or a multiplexer. Thus the commands from the processor core or the service interface controller may be tagged and sent to the I/O devices in a controlled manner by the request arbiter, whereas on the other side the information from the I/O devices may be controlled and fed to the processor core or the service interface controller by the multiplexer according to the request for the information coming from.

Due to an advantageous embodiment, the storage means may comprise at least a command register, a data register and/or a status register. The command register may contain commands to be generated for the I/O devices, which may comprise either a component interconnect (CI) Load (8 Byte Fetch) or CI Store (8 Byte Store) as well as a hub address. The hub address contains the I/O address and routing bits to select an I/O bus port. The data register may contain for CI Load, the data fetched from I/O devices after the command has finished. For CI Store, the data register contains data to be written to I/O devices. The status register may contain completion bits to indicate whether an I/O access is finished as well as status bits returned from I/O devices to indicate success or failure of the command.

Advantageously, the storage means may be implemented in the bus controller. This is a very efficient way of implementing the storage means in the data processing system because it enables a direct way to feed the relevant information from the service interface controller to the I/O subsystem and to the I/O buses the data processing system is connected to. The bus controller already contains registers for other purposes which means that the communication infrastructure already exists in the bus controller. Three additional registers thus is a minor change to the architecture of the bus controller.

According to a further advantageous aspect of the present invention, a method is provided for communicating to an input/output bus of a data processing system, the data processing system comprising a processor nest communicatively coupled to the input/output bus by the bus controller, and further comprising a service interface controller communicatively coupled to the processor nest. The method comprises (i) storing commands for the bus controller and associated command data and resulting status data in storage means, the storage means communicatively coupled to the processor nest and the bus controller, (ii) reading and writing the storage means by the service interface controller, in response to a received service command, (iii) executing the command specified in the storage means, (iv) retrieving the result of the command, and (v) storing the result of the command in the storage means.

The invention disclosed herein describes a method to reach the mainline I/O path via a service interface controller. Instead of receiving commands from a processor nest, three additional registers in the logic are used to control I/O operations: a command register, a data register and a status register. They are written and read from the service interface controller. E.g. for a store command to I/O devices, store data would be written to the data register. A store command with the store address would be written to the command register. Then the state machines used to handle processor commands would send the command with data to the I/O devices. Response from the I/O devices is stored in the status register. It also indicates completion of the command. In this way it is possible to write I/O test programs for performing functional commands which would normally be executed by the processor, but could according to the invention be executed even when no processor core is working, allowing bringup of I/O devices to start in parallel with processor bringup. This feature is used to reduce bringup time, yet it could also be used during the data processing system being in a functional status.

According to the present invention, a dedicated hardware resource comprising storage means is connected to a service interface controller or service communication interface (SCOM) on one side and to the state machines performing processor-to-I/O operations via external commands (xcmd) on the other side. This path allows to exercise I/O access without the need for a functional processor core/nest. The purpose of the invention is to reduce bringup time, but it can also be used in a functional data processing system to e.g. read/write all registers accessible by the service interface controller during regular operation without the necessity of a code change/reload. When used in functional mode, commands from the service interface controller are interleaved with commands from the mainline path. Service interface commands are tagged, so their result from IO is not forwarded to the processor nest, but to a status register instead.

Advantageously, communication between the service interface controller and the bus controller may be performed without a processor core running. The service interface controller is thus able to initiate relevant commands for communicating with an I/O subsystem of the data processing system for sending data to and receiving information from the I/O subsystem. Thus it is possible to bringup the I/O subsystem in complete separate manner and speedup the whole bringup process significantly.

Due to an advantageous embodiment, commands from the service interface controller may be interleaved with commands from the processor nest by using interface means. Thus it is possible to control the communication between the processor nest to the I/O devices and separate them from the communication of the service interface controller to the I/O devices and keep them separate in order not to mix up the information flows between the different devices and systems.

Favorably, commands from the service interface controller may be tagged to interleave with commands from the processor nest. By this way it is easily possible to distinguish between commands coming from the processor core or coming from the service interface controller and keep the commands of the service interface controller as well as information from executing these commands on the I/O devices separate from the commands and information originating from the processor core.

Due to a favorable embodiment, the service interface controller may be configured to read/write all registers accessible by the service interface controller. This feature may be of advantage for checking debug information in a running system because it enables to read/write the debug registers without disturbing running processes in the processor core. Thus it is possible to operate on debug data in an asynchronous way from a completely separate data channel.

According to a further advantageous aspect of the invention, a data processing program for execution in a data processing system is proposed comprising an implementation of an instruction set for performing a method as described above when the data processing program is run on a computer.

Further, a computer program product is disclosed herein comprising a computer usable medium including a computer readable program, wherein the computer readable program when executed on a computer causes the computer to perform a method for communicating to an input/output bus of a data processing system, the data processing system comprising a processor nest communicatively coupled to the input/output bus by the bus controller, and further comprising a service interface controller communicatively coupled to the processor nest, comprising (i) storing commands for the bus controller and associated command data and resulting status data in storage means, the storage means communicatively coupled to the processor nest and the bus controller, (ii) reading and writing the storage means by the service interface controller, in response to a received service command, (iii) executing the command specified in the storage means, (iv) retrieving the result of the command, and (v) storing the result of the command in the storage means.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire connection, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

Due to a further aspect of the invention, a data processing system for execution of a data processing program is proposed, comprising software code portions for performing a method described above.

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

What is claimed is:

1. A data processing system comprising:
a processor nest coupled to a processor core, the processor nest comprising memory subsystem and a bus controller, the processor nest being communicatively coupled to an input/output (I/O) bus by the bus controller and providing a mainline I/O path of the processor core to the I/O bus; and
a service interface controller, separate from the mainline I/O path of the processor nest, and communicatively coupled to use the bus controller, allowing the service interface controller access to the I/O bus separate from the mainline I/O path of the processor core to the I/O bus, wherein the system further comprises:
storage communicatively coupled to the service interface controller for storing commands for access by the bus controller and associated command data and resulting status data, the storage being associated with the bus controller, and the commands being associated with the service interface controller; and
the service interface controller being configured, in response to received service commands, to read and write the storage, to execute a command specified in the storage, to retrieve the result of the command, and to store the result in the storage.

2. The data processing system of claim 1, wherein the service interface controller is connected directly to the bus controller of the mainline I/O path for the processor core.

3. The data processing system of claim 1, wherein the service interface controller is communicatively coupled to an I/O interface of the bus controller, the I/O interface being coupled to the I/O bus.

4. The data processing system of claim 1, wherein an interface arbiter is provided to interleave I/O bus communication of the mainline I/O path for the processor core to the I/O bus and the service interface controller.

5. The data processing system of claim 4, wherein the interface arbiter is part of the bus controller and comprises at least a request arbiter and/or a multiplexer.

6. The data processing system of claim 1, wherein the storage comprises at least one of a command register, a data register, or a status register for use by the service interface controller.

7. The data processing system of claim 1, wherein the storage is part of the bus controller.

8. A method for communicating to an input/output bus of a data processing system, the method comprising:
   storing in storage commands for a bus controller and associated command data and resulting status data in a storage, the storage being communicatively coupled to the bus controller, and the commands being associated with a service interface controller, the bus controller being part of a processor nest associated with a processor core, the processor nest further comprising a memory subsystem and providing a mainline I/O path for the processor core to an I/O bus, the service interface controller being separate from the mainline I/O path, and communicatively coupled to use the bus controller, allowing the service interface controller to access to the I/O bus separate from the mainline I/O path of the processor core to the I/O bus access to the I/O bus;
   reading and writing the storage by the service interface controller, in response to a received service command;
   executing a command specified in the storage;
   retrieving the result of the command; and
   storing the result of the command in the storage.

9. The method of claim 8, wherein communication between the service interface controller and the bus controller is performed without the processor core running.

10. The method of claim 8, wherein commands from the service interface controller are interleaved with commands of the mainline I/O path using an interface arbiter of the bus controller.

11. The method of claim 8, wherein commands from the service interface controller are tagged to facilitate interleaving with commands of the mainline I/O path.

12. The method of claim 8, wherein the service interface controller is configured to read/write all registers of the storage accessible by the service interface controller.

13. A computer program product for facilitating communicating to an input/output (I/O) bus of a data processing system, the computer program product comprising:
   a non-transitory computer readable storage medium storing a computer readable program, wherein the computer readable program when executed by a processor causes the processor to perform a method of communicating to the input/output bus of the data processing system, the data processing system comprising a processor nest communicatively coupled to a processor core, the processor nest comprising a memory subsystem and a bus controller for the processor core, the processor nest further being communicatively coupled to the I/O bus by the bus controller and providing a mainline I/O path for the processor core to the I/O bus, the data processing system further comprising a service interface controller communicatively coupled to storage for storing commands for access by the bus controller, the service interface controller being communicatively coupled to use the bus controller, allowing the service interface controller access to the I/O bus separate from the mainline I/O path for the processor core to the I/O bus, the method comprising:
      storing commands for the bus controller and associated command data and resulting status data in storage, the storage being communicatively coupled to the processor nest and the bus controller;
      reading and writing the storage by the service interface controller, in response to a received service command;
      executing the command specified in the storage;
      retrieving the result of the command; and
      storing the result of the command in the storage.

14. The computer program product of claim 13, wherein communication between the service interface controller and the bus controller is performed without the processor core running.

15. The computer program product of claim 13, wherein commands from the service interface controller are interleaved with commands of the mainline I/O path within the bus controller.

16. The computer program product of claim 13, wherein commands from the service interface controller are tagged to facilitate interleaving with commands of the mainline I/O path.

17. The computer program product of claim 13, wherein the service interface controller is configured to read/write all registers of the storage accessible by the service interface controller.

* * * * *